Feb. 10, 1970     R. L. TAYLOR     3,494,286

HYBRID FUEL GRAIN SLIVER REDUCTION

Filed April 17, 1968

INVENTOR.
ROBERT L. TAYLOR
BY Harry A. Herbert Jr.
and Arsen Tashjian
ATTORNEYS

United States Patent Office

3,494,286
Patented Feb. 10, 1970

---

3,494,286
HYBRID FUEL GRAIN SLIVER REDUCTION
Robert L. Taylor, Cupertino, Calif., assignor to the United States of America as represented by the Secretary of the Air Force
Filed Apr. 17, 1968, Ser. No. 721,977
Int. Cl. F42b *15/00, 1/02*
U.S. Cl. 102—99                                             1 Claim

ABSTRACT OF THE DISCLOSURE

A technique for reducing the slivers of unburned fuel which remain in certain areas of fuel grains of complex configuration by providing strategically positioned satellite ports in the vicinity of the problem areas. The satellite ports remain inactive until the burning surface of the primary port uncovers the satellite port at which time the satellite port surface becomes part of the primary burning surface.

BACKGROUND OF THE INVENTION

This invention relates to a system for achieving substantially complete combustion of the propellant grain in a hybrid rocket propulsion system and, more particularly, the invention is concerned with providing a technique for reducing the relatively large corner slivers of unburned fuel which remain in hybrid rockets having complex fuel grain cross-sectional configuration.

Heretofore, in hybrid rocket propulsion systems where a liquid oxidizer is used with a solid phase fuel, relatively large slivers of unburned fuel remain in the corners at the junctures of the fuel grain elements after the burning cycle has been completed. This condition is especially prevalent when complex fuel grain cross-sections are employed because hybrid fuel regression rates are characteristically low. With advancements in the rocket motor art it has been found that significant advantages can be gained by using unusually complex shaped propellant charges having a cavity in the central portion to produce a larger burning surface so that greater thrust is developed during operation. The size and shape of the cavity in the propellant is a significant factor in determining the efficiency of the rocket motor.

In certain instances where unusually complex shaped fuel grains are utilized and where high volumetric levels are required, the unburned fuel slivers may contain on the order of ten percent, by weight, of the initial fuel amount. The resulting poor propellant utilization imposes a severe overall propulsion system performance penalty. A much more efficient system could be produced if the solid propellant grain could be designed so that substantially complete combustion without slivers results after the liquid oxidizer is introduced into fuel grain cavity and the burning cycle is completed.

SUMMARY OF THE INVENTION

The present invention is primarily concerned with the provision of a propellant grain for use in a hybrid fuel system whereby substantially complete combustion is achieved with little or no unburned fuel slivers remaining. In a typical example of a fuel grain of four-spoke cartwheel design, the propellant is composed of four pie-shaped quadrants each having a single pie-shaped opening in the geometric center into which the liquid oxidizer is introduced. This causes the surface of the fuel grain to be consumed and the opening to become progressively larger. The shape of the opening becomes more circular so that the burning surface first reaches the center side portions of the fuel grain, leaving unburned fuel slivers in the corners. In the practice of my invention, a series of strategically placed satellite ports are located in the area near the corners of the fuel grain. This arrangement increases the surface area in the corners allowing the fuel to be completely consumed and, for all practical purposes, eliminates the slivers of unburned fuel.

Accordingly, it is an object of the invention to provide a fuel grain configuration for use in a hybrid rocket propulsion system having satellite ports in critical areas to provide substantially complete burning of the fuel grain.

Another object of the invention is to provide a fuel grain of the four-spoke cartwheel design in which each quadrant includes satellite ports in the vicinity of the corners as well as the pie-shaped primary port in the central area.

Still another object of the invention is to provide a fuel grain configuration in which a series of satellite ports are positioned near the outer periphery and remain inactive until uncovered by the burning surface of the primary port at which time the satellite port surface becomes part of the primary burning surface.

A further object of the invention is to provide a fuel grain wherein a standard primary port shape can be utilized in conjunction with a variety of fuel grain configurations by controlling the final port shape with a series of strategically located satellite ports of predetermined size and shape.

These and other objects, features, and advantages will become more apparent after considering the following detailed description taken in conjunction with annexed drawings and appended claims.

DESCRIPTION OF THE DRAWINGS

In the drawings wherein like reference characters refer to like parts in the views.

PREFERRED EMBODIMENT OF THE INVENTION

The utilization of the present invention is directed toward the elimination of slivers of unburned fuel particularly in the corners of fuel grains of complex configuration. In the past, it was generally found that the only means for controlling the shape of the hybrid fuel grain during the burning cycle was to vary the shape of the central or primary port. However, regardless of the many unusual shapes tested and used, the results were usually the same, that is, relatively large slivers of unburned fuel remained in the corners of the fuel grain.

In the present invention, a new and improved technique is utilized to reduce the slivers to a minimum and achieve substantially complete combustion of the propellant grain. The primary port may be shaped to conform to the general outline of the propellant grain or, if desired, any other convenient shape can be utilized as the primary fuel port or cavity into which the liquid oxidizer is injected. A series of satellite ports are positioned in the corner areas to aid in the complete combustion of the fuel grain and eliminate the unburned slivers. The satellite ports become active burning surfaces when the primary port is sufficiently enlarged as a result of the combustion process.

Figure 1:
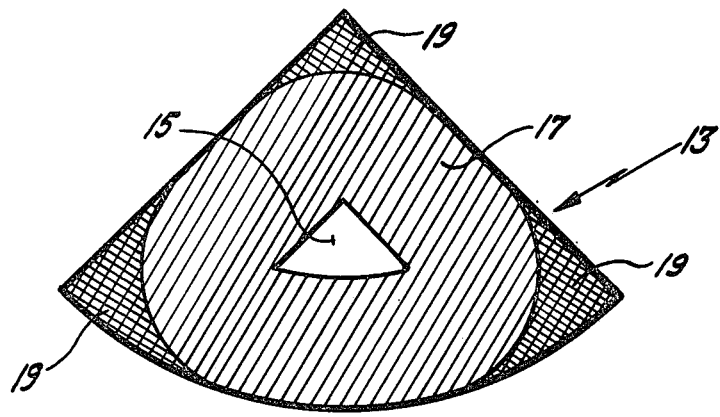
FIGURE 1 is a cross-sectional view of a conventional prior art four-spoke cartwheel fuel grain design showing the large slivers of unburned fuel remaining after firing.

Referring now to FIGURE 1, there is shown a cross-sectional view of one quadrant of a four-spoke cartwheel grain design 13 having a primary fuel port 15 in the central portion thereof. The port 15 is shaped to conform to the general outline of the propellant grain. As shown in FIGURE 1, which is the conventional fuel grain configuration, the single cross-hatched section 17 represents the final shape of the primary port in the fuel grain at burn-out. The slivers 19, shown in double cross-hatching, remain unburned in the corners of the fuel grain after the primary port 15 reaches its maximum size. Thus, it can be seen that, in the fuel grain shape illustrated, a relatively large percentage of the fuel grain remains unburned.

Figure 2:
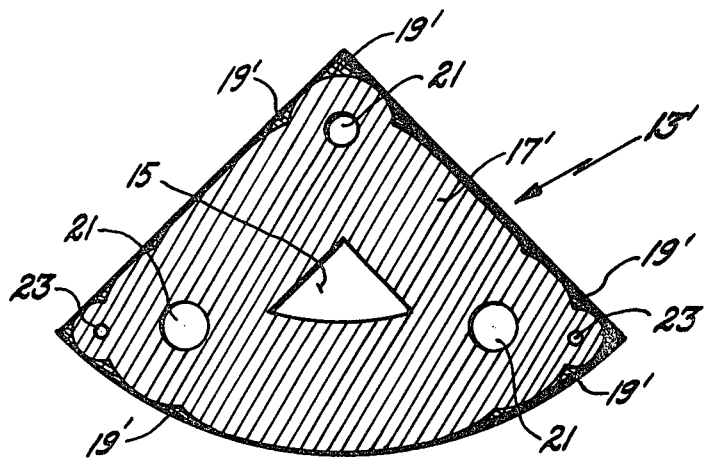
FIGURE 2 is a cross-sectional view of a four-spoke cartwheel fuel grain design including satellite ports according to the invention showing the nearly complete absence of slivers.

In FIGURE 2, there is shown a fuel grain 13' according to the invention which is provided with a primary fuel port 15 similar in shape and size to the prior art fuel port in FIGURE 1. A series of strategically positioned satellite ports 21 are included in the fuel grain near the corner areas. Other satellite fuel ports 23 which are smaller in size are located closer to the corner. In the fuel grain according to the invention shown in FIGURE 2, the final shape of the burned fuel grain 17' is indicated in a single cross-hatching. In the fuel grain configuration 13', which includes satellite ports 21 and 23, practically all of the propellant is consumed prior to burn-out and only extremely small slivers 19' remain in the corner areas. A more effective thrust is produced by the fuel grain 13' in the same volume as that shown in FIGURE 1 because the grain is lighter in weight due to the satellite ports which operate to produce substantially complete combustion of the fuel grain by the oxidizer.

MODE OF OPERATION

The hereinbefore described fuel grain provides simple and efficient solution to the problem of eliminating unburned slivers of fuel at burn-out. The sliver reduction technique makes use of a series of strategically positioned satellite ports to provide auxiliary burning surfaces in and near the corners of the complex hybrid fuel grain so that substantially all of the fuel is consumed at burn-out.

In operation, oxidizer is injected into only the primary fuel port 15 which enlarges as fuel is consumed. The satellite ports 21 and 23 remain inactive until the burning surface of the primary port uncovers the satellite ports and the satellite surface becomes a part of the primary burning surface. Minor regression or burning of the satellite ports prior to being reached by the primary burning surface is acceptable.

In the above-described manner, the primary port cavity configuration is altered by the presence of the satellite ports and the burning surface is made to conform more closely to a sliverless burning surface profile. At high volumetric loading levels the use of satellite ports can prevent the formation of unburned slivers which could contain as much as ten percent of the initial fuel amount. My invention thereby produces a propulsion system having excellent propellant utilization characteristics with correspondingly superior overall performance.

Any number of satellite ports may be employed and a variety of hole shapes used depending upon the particular fuel grain design being employed. Satellite port shapes can include circular, triangular, rhombic or slotted holes. In addition, the use of satellite ports can permit the use of initial primary port shapes which do not conform to the required final port shape. For example, a circular primary port can be employed and the final port surface made to approximate the pie-segment shape which is required in the cartwheel grain family by using satellite ports as hereinbefore described.

Having thus described my invention what I claim and desire to secure by Letters Patent of the United States is:

1. A propellant grain for use in a hybrid rocket motor, said propellant grain being substantially pie-shaped in cross-sectional configuration and forming one quadrant of a four-spoked cartwheel fuel grain, said propellant grain comprising a solid propellant surrounding a primary port disposed in the central axial region of said propellant grain and conforming generally to the configuration thereof, a series of first satellite ports positioned between each of the corners of the primary port and the corresponding corners of the propellant grain, auxiliary satellite ports positioned between the first satellite ports and the lower corners of the propellant grain, said auxiliary satellite ports becoming active after being reached by the burning surface passing through said first satellite ports, thereby producing substantially complete combustion of the propellant grain.

References Cited

UNITED STATES PATENTS

| Re. 12,660 | 6/1907 | Maxim | 102—100 |
| 1,077,320 | 11/1913 | Walsh | 102—99 |
| 1,274,258 | 7/1918 | Gerdom | 102—101 |
| 3,296,794 | 1/1967 | Nash | 62—255 X |

FOREIGN PATENTS

| 17,994 | 1895 | Great Britain. |

ROBERT F. STAHL, Primary Examiner